Oct. 13, 1931.       G. RODRIGUES       1,827,403
DIFFERENTIAL MECHANISM
Filed Dec. 18, 1930
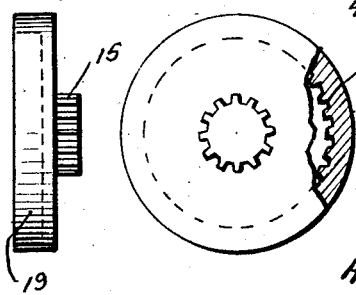
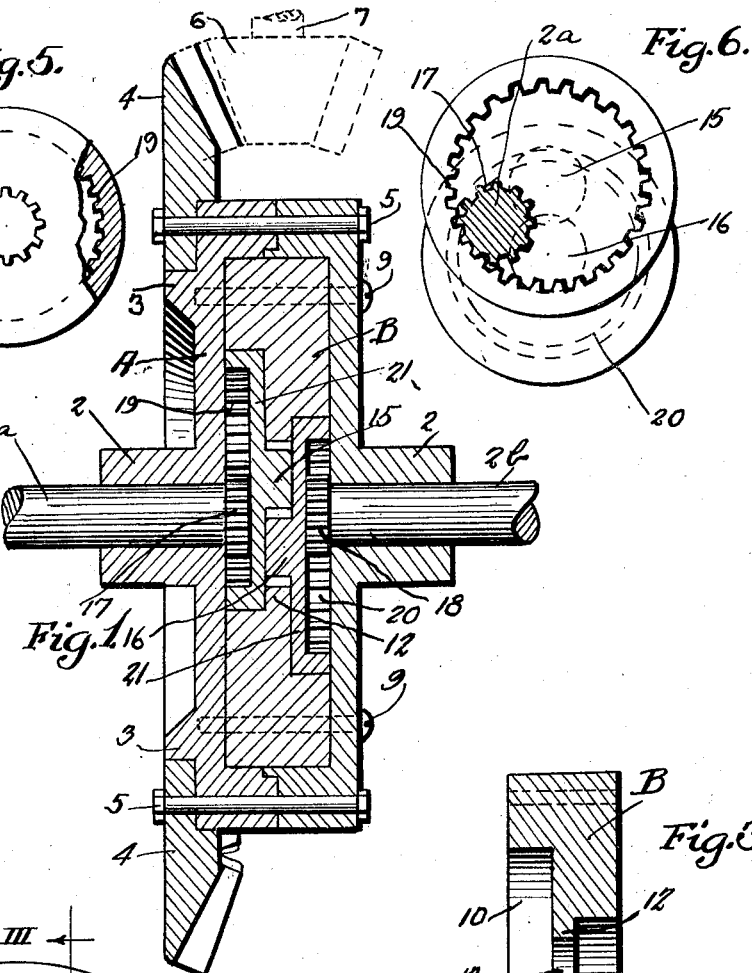
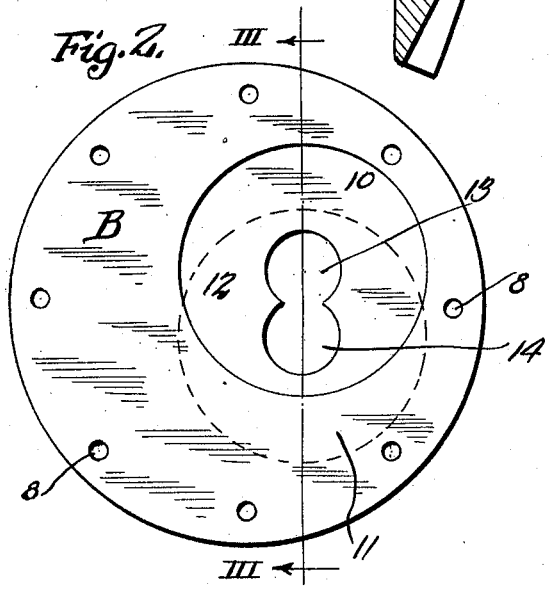
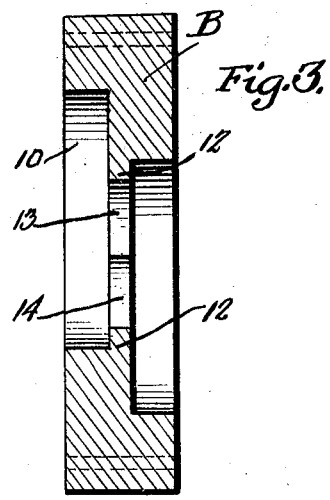
INVENTOR.
George Rodrigues
BY Francis H. Davis
ATTORNEY Patented Oct. 13, 1931

1,827,403

UNITED STATES PATENT OFFICE

GEORGE RODRIGUES, OF CASTROVILLE, CALIFORNIA

DIFFERENTIAL MECHANISM

Application filed December 18, 1930. Serial No. 503,301.

The present invention relates to mechanism adapted to compensate for the difference of speed between two driving ground engaging wheels of an automotive vehicle, and the objects thereof comprise the following desiderata:—

To provide means to drive both wheels positively irrespective of whether both said wheels or only one has tractive contact with the ground. In other words, to provide means for transmitting positive differentially-controlled propulsion to both drive wheels when both have traction and means to positively drive either wheel when the other is on a non-tractive surface such as presented by mud, loose ground, sand or the like.

To provide in combination with a chambered carrier that is concentric with the driven axles, a differential mechanism revoluble with the carrier, said mechanism comprising a disc element counterbored from each side to journal annular floating gears each of which is provided with a concentric outwardly-disposed spur pinion. Said counterbores being off-set in parallelism to provide a partition between them which is slightly thicker than the length of the pinion face. These counterbores are disposed sufficiently eccentric to each other to allow said pinions to mesh with each other within holes for their accommodation provided in the partition.

The respective driven axles, which are disposed in true axial alinement with each other, abut against the respective adjacent webs of said annular gears and are each provided with a pinion meshing with its respective annular gear, a novel arrangement of differential elements which permits differential movement for rounding curves, positive drive of both axles when both have traction and positive drive for either ground-engaging wheel when the other is slipping.

To provide a differential mechanism having the fewest number of parts to manufacture, and to cause wear, or to cause friction or to be lubricated.

To provide a differential mechanism devoid of individual axes for its gears and pinions, together with further objects and advantages that may hereinafter appear, are particularly pointed out in the claims and illustrated in the accompanying drawings made part of this specification, in which:—

Figure 1 is a view in longitudinal mid-section through a differential embodying my invention.

Figure 2 is a side elevation of the disc-like element.

Figure 3 is a section taken on the line III—III of Figure 2.

Figure 4 is a side elevational view of one internal gear with a concentric pinion extending outwardly therefrom.

Figure 5 shows a plan view of Figure 4 with said pinion uppermost.

Figure 6 is a side elevational view of two such gears as shown in Figure 4 placed back to back with the pinions intermeshing with each other.

Similar reference indicia refer to similar parts throughout the several views.

In carrying out my invention I provide the split differential carrier A adapted to house the disc element B rigidly secured therein by the screws 9.

The hubs 2—2 concentric with the carrier extend outwardly from the respective sides of the carrier and journal the inner ends of the axles 2a and 2b. The concentric flange 3 centers the ring gear 4 secured to the carrier by screws 5 which extend through both said gear and said carriers, thus binding the respective parts and gear together. Said gear 4 is meshed with the pinion 6 fast on the propeller shaft 7.

It will be noted by Figures 2 and 3 that the disc element B, which is an exact fit within the carrier A, is provided with the holes 8 to accommodate the screws 9 shown in Figure 1 as locking said disc to rotate with said carrier, and also affording additional means to bind the respective members of the carrier together.

By further reference to Figures 2 and 3 it is seen that the disc B is provided with the recesses 10 and 11 set off from each other by the partition 12 which is suitably perforated at 13 and 14 to allow the respective pinions 15 and 16 to extend through said partition from opposite sides when said pinions are intermeshed, said recesses being suitably eccentric to each other to permit this arrangement of the pinions which is well shown in Figure 1 wherein the driven pinions 17 and 18 fast to their respective axles 2a and 2b are shown in their axial relation to the respective annular gears 19 and 20 with which they are always meshed.

Figure 6 shows the relative positions of both said gears and all said pinions, from which it will be clearly noted that by this novel arrangement of parts I am enabled to attain a differential drive for either said axle and a positive drive for either said axle irrespective of the tractive resistance opposed to the other.

It will be noted by Figure 1 that the annular gears 19 and 20 are both alike and both provided with means as the webs 21 to carry their respective pinions 15 and 16 integrally and concentrically therewith. When rounding corners the novel arrangement of my differential mechanism permits automatic regulation of the speed of rotation of either said axle according to the radius of the arc described.

From the foregoing it will be seen that I have invented a novel differential mechanism of great utility. I do not claim a differential mechanism broadly, but—

I claim:

1. The combination with two alined axles: of a differential carrier concentric to said axles; a disc element within the carrier concentric thereto and revoluble therewith; two off-set floating annular gears journaled in the element, pinions fixed on the axles respectively and engaging respectively with said annular gears; external pinions carried concentrically by said annular gears, said pinions arranged to mesh with each other.

2. A differential mechanism comprising a rotary carrier, two recesses within the carrier, said recesses eccentric to the carrier and to each other, internal annular gears journaled in the recesses of said carrier, a pinion connection between the internal gears, axles extending into said carrier, a propeller shaft for rotating said carrier; and a driving pinion between said annular gears and axles.

3. In a differential mechanism as specified in claim 1 respective seats for the respective floating annular gears and spacing means between said seats.

4. In a differential mechanism, and in combination, a rotary carrier, means within the carrier and revoluble therewith comprising right and left hand recesess eccentric to said carrier and to each other; right and left hand internal annular gears mounted in the respective recesses of said carrier, a meshing concentric pinion on each gear, right and left hand axles extending into the carrier a driving means between said axles and their respective annular gears and means for rotating said carrier.

In testimony whereof I affix my signature this 11th day of December, 1930.

GEORGE RODRIGUES.